United States Patent [19]

Webster

[11] 4,233,941
[45] Nov. 18, 1980

[54] DISPOSABLE WILD BIRD FEEDER

[75] Inventor: Ralph K. Webster, Andover, Mass.

[73] Assignee: H. K. Webster Company, Inc., Lawrence, Mass.

[21] Appl. No.: 15,046

[22] Filed: Feb. 26, 1979

[51] Int. Cl.³ .............................................. A01K 5/00
[52] U.S. Cl. ................................. 119/52 R; 229/17 B
[58] Field of Search ........................... 119/52 R, 51 R; 229/17 B, 17 SC

[56] References Cited

U.S. PATENT DOCUMENTS

| | | | |
|---|---|---|---|
| 1,189,779 | 7/1916 | Becker | 229/17 B |
| 2,775,226 | 12/1956 | Early | 119/52 R |
| 2,891,711 | 6/1959 | Early | 119/51 R X |
| 2,907,512 | 10/1959 | Leone | 229/7 SC X |
| 3,207,380 | 9/1965 | Hennessey | 229/17 B X |
| 4,119,263 | 10/1978 | Cuthbertson et al. | 229/17 B |

Primary Examiner—Hugh R. Chamblee
Attorney, Agent, or Firm—Hill, Van Santen, Steadman, Chiara & Simpson

[57] ABSTRACT

A disposable bird feeder formed from a die cut and scored piece of bendable sheet material forms a rectangular tubular container in which a plastic bag of bird seed may be enclosed. A top portion is folded and sealed so as to form a closed top hanging section with a tab suitable for suspending the bird feeder. A closed lower end providing a wall generally perpendicular to the body panels includes a perch floor affixed to a lower feed panel and extends out at an acute angle to a front body panel. A pair of perch support brackets engages a pair of punched regions in the front body panel to support the perch floor adjacent a feed aperture.

6 Claims, 5 Drawing Figures

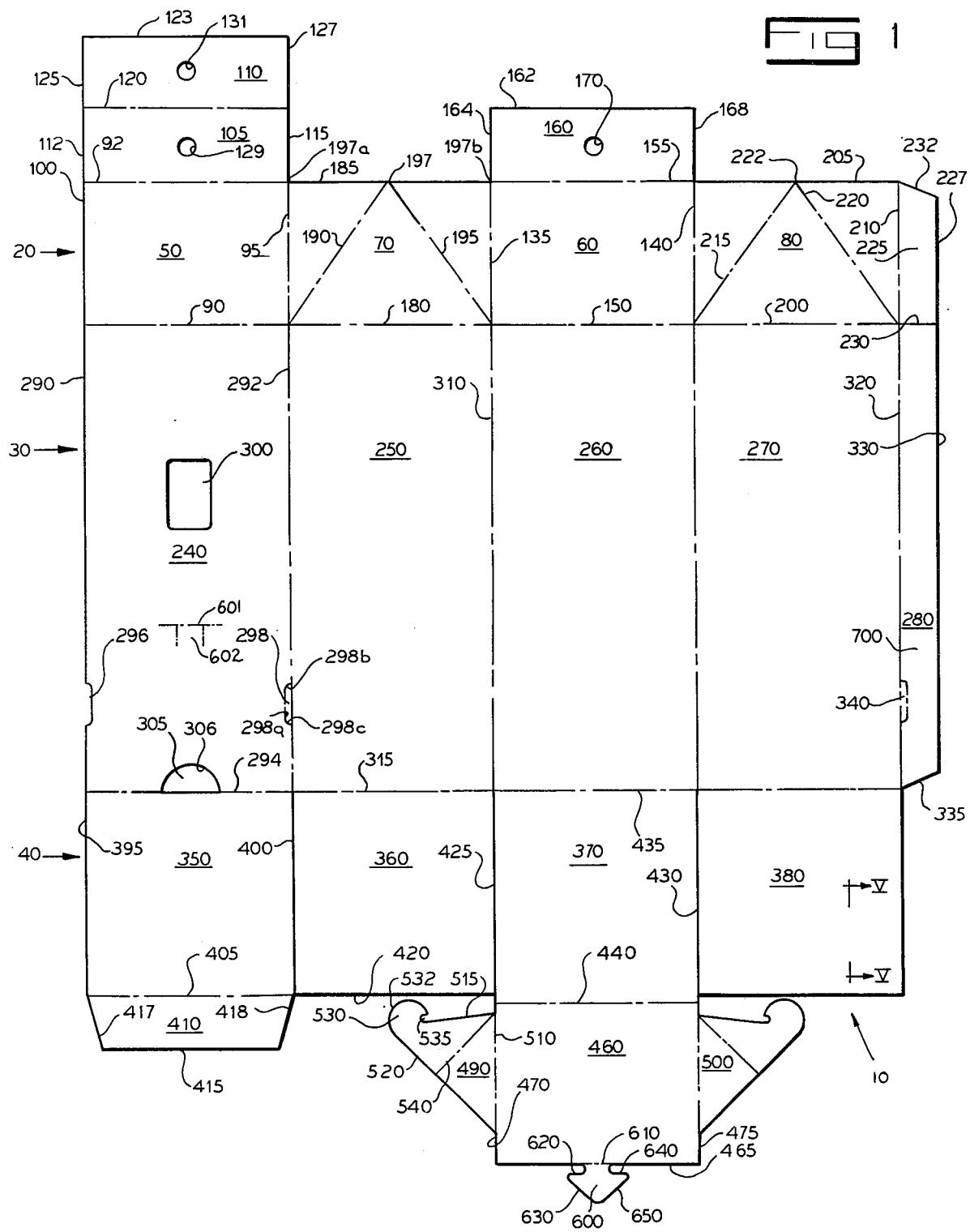

U.S. Patent    Nov. 18, 1980    Sheet 2 of 2    4,233,941
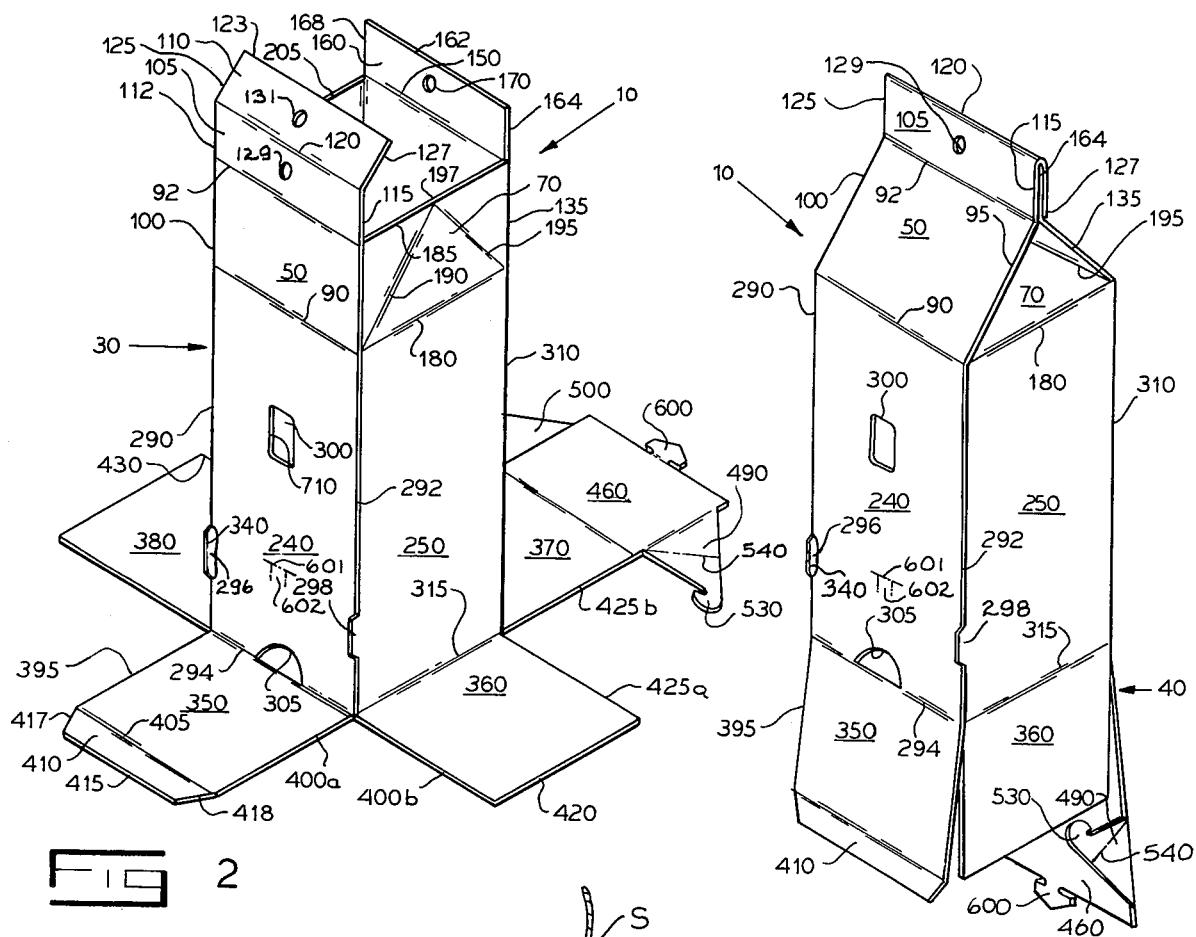
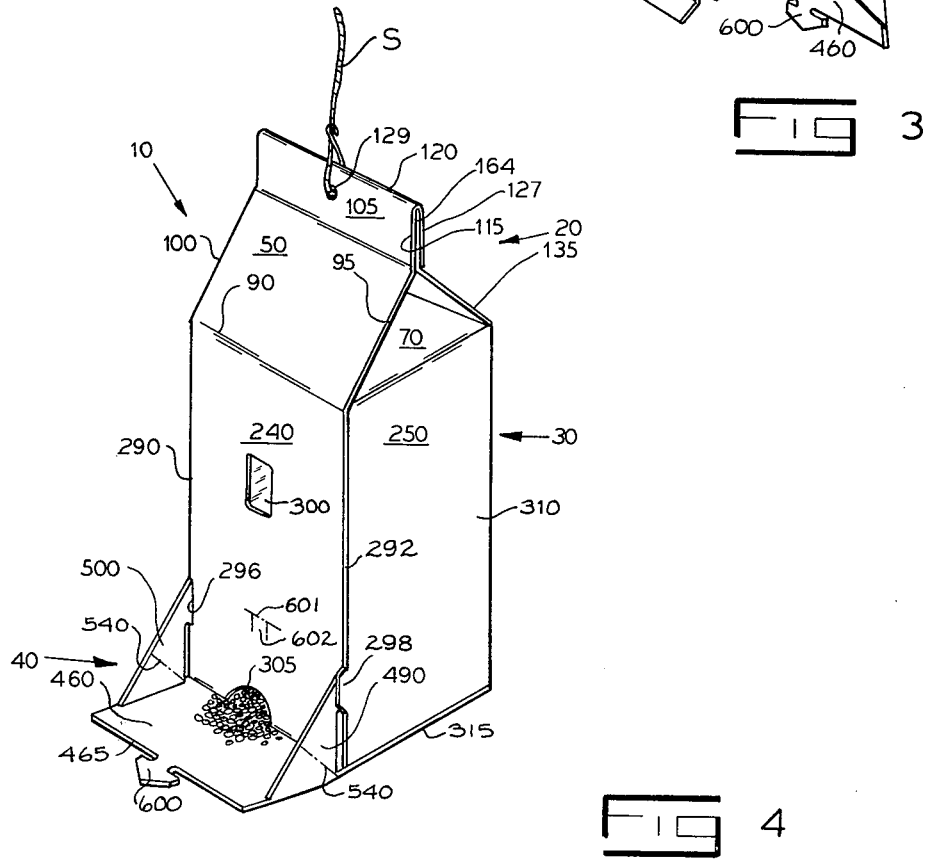

4,233,941

DISPOSABLE WILD BIRD FEEDER

BACKGROUND OF THE INVENTION

1. Field of the Invention

The field of the invention pertains to bird feeders.

2. The Prior Art

Bird feeders have long been known in the prior art. These generally, however, are of a permanent form made out of wood or glass or plastic or a combination thereof.

BRIEF SUMMARY OF THE INVENTION

The bird feeder of the present invention provides a closure structure formed from a single piece of die cut and scored sheet material such as a bendable relatively stiff paper or chipboard, thereby forming an inexpensive bird feeder that is expendable so as to minimize or eliminate the cleaning and storage problem associated with prior art feeders.

The bird feeder of the present invention structurally resembles a milk carton in which the gusseted top section forms a roof and has an apertured suspension tab at the apex by means of which the feeder may be hung in a tree or in a visible place adjacent a house or an apartment.

The central body section forms a rectangular tube for enclosing a plastic bag of bird seed and the bottom section closes the tube and provides a selectively activated perch and feeding station. The perch includes a gusseted flap having a latch tab which normally locks with a detent in the front wall of the feeder. When detached and pulled down, the gusseted flap forms a perch floor adjacent a metering opening formed at the bottom of the front wall or panel.

The plastic bag is perforated at the metering opening and bird seed meters through the opening gravitationally onto the perch. When the feeder is empty, it can be refilled with another bag of seed, or the entire unit is readily disposed, since its economical construction makes it expendable.

BRIEF DESCRIPTION OF THE DRAWINGS

FIG. 1 is an elevational view of a sheet form blank shaped according to the principles of the present invention;

FIG. 2 is a perspective view of the sheet form blank of FIG. 1 partially assembled to form the body section;

FIG. 3 is a perspective view of the sheet form blank of FIG. 2 in a further stage of assembly with the top hanging section completely formed;

FIG. 4 is a perspective view of the bird feeder fully assembled and with the perch folded out to an operating position;

FIG. 5 is a section view of the sheet form member taken along line V—V of FIG. 1.

DETAILED DESCRIPTION OF THE PREFERRED EMBODIMENT

A disposable bird feeder 10 comprises a single precut and pre-scored sheet form blank made of bendable but relatively stiff paper or chipboard adapted to form a generally tubular enclosure with a top hanging section 20, a central body section 30, and a lower feed dispensing section 40.

The top section 20 has a front and a rear rectangular panel 50 and 60, and two generally rectangular side panels 70 and 80. The panel 50 is bounded by a pair of parallel score lines 90, 92 which are perpendicular to an edge 100 and a score line 95 parallel to the edge 100.

A pair of hanging tabs 105 and 110 are affixed to the panel 50 at the score line 92. The first hanging tab 105, of a generally rectangular shape, has a pair of parallel edges 112 and 115 which are perpendicular to a second pair of sides defined by the score line 92 and a second score line 120. The second hanging tab 110 is defined by an edge 123 parallel to the score line 120, both of which are perpendicular to a pair of edges 125, 127. Each of the hanging tab structures 105, 110 has a centered hole 129, 131 to facilitate hanging the assembled bird feeder 10.

It should be noted that the die cut edges 112, 125 are coextensive and parallel to the edges 115 and 127 which are also coextensive with one another. The score lines 90, 92 and 120 are all parallel to the die cut edge 123.

The rear top panel 60 is of a generally rectangular shape being defined by a pair of parallel score lines 135, 140 which perpendicularly intersect a second pair of parallel score lines 150, 155. Affixed to the panel 60 at the score line 155 of the panel 60 is a third hanging tab 160. The hanging tab 160 has a generally rectangular shape with an edge 162 parallel to the score line 155 and pair of parallel edges 164, 168 perpendicular to the edge 162 and the score line 155. A hole 170 is centered in the hanging tab 160 to facilitate hanging of the assembled bird feeder 10. The score line 135 is coextensive with the edge 164 and parallel to the score line 140 which is coextensive with the edge 168.

The side panel 70, of a generally rectangular shape, is defined by a score line 180 parallel to an edge 185 and the parallel score lines 95 and 135 which are perpendicular to the score line 180. The panel 70 has an isosceles triangle foldingly defined thereon having a pair of equal sides defined by score lines 190, 195 and a base defined by the score line 180. The two sides of the isosceles triangle 190, 195 come together at an apex 197 which bisects the edge 185.

Two right triangles are also defined on the panel 70. A first right triangle has a hypotenuse corresponding to the score line 190, a side corresponding to the score line 95 and a base corresponding to the edge 185 between the apex 197 and a first point 197a.

The second right triangle is defined by the score line 195, the hypotenuse, the score line 135, one side, and the edge 185 between the apex 197 and a second point 197b.

The second side panel 80, generally of a rectangular shape, is defined by a score line 200 which is parallel to an edge 205, each of which are perpendicular to the score line 140 and a score line 210. Defined on the second side panel 80 is an isosceles triangle having a pair of equal sides defined by a pair of score lines 215, 220 and a base defined by the score line 200. One side of the isosceles triangle defined by the score line 215 intersects the score line 200 at a point composed of the score lines 150, 140 and 200. The second side 220 of the isosceles triangle, intersects the score line 200 at a point defined by the intersection of the score line 210 and the score line 200. The other end of each of the score lines 215 and 220 intersect at a point 222 which bisects the edge 205. As was the case with respect to the panel 70 a pair of right triangles is also defined on the panel 80.

A sealing tab 225 is foldingly affixed to the panels 80 and 270 at the score line 210 of the side panel 80. The sealing tab 225, generally of a rectangular shape, has a pair of parallel sides comprising the score lines 210 and an edge 227, and a score line 230 perpendicular to the score line 210 and the edge 227. A forth edge 232 joins the score line 210 and the edge 227. The edge 232 is not parallel to the score line 230, but is at an acute angle thereto.

While they have been described in terms of bounding different panels, it should be noted from FIG. 1 that the score lines 90, 180, 150 and 200 coincide linearly. Similarly, the score lines 92 and 155 coincide linearly with the edges 185 and 205.

The body section 30 of the bird feeder 10 is comprised of a set of four rectangular panel members 240, 250, 260 and 270. The panel 240 is bounded by a pair of parallel score lines 90 and 294 which are perpendicular to a second pair of sides, an edge 290 and a score line 292.

A pair of rectangular openings 296, 298 which may be lanced or struck out is located respectively along the edge 290 and the score line 292 for cooperation with a corresponding detent means or a pair of locking tabs. The opening 296 is a notch in the edge 290 while the opening 298 has one elongated edge 298a, and two shorter perpendicular edges 298b, c.

A rectangular window 300 is centrally located at a selected position in the front panel 240 to afford a viewing aperture and to decoratively enhance the appearance of the feeder. A feed dispensing aperture 305 having a circular edge 306 is centered along the score line 294. The score line 294 corresponds to the bottom edge of the panel 240 once the feeder 10 is assembled.

The other three body forming panels 250, 260, 270 are all generally of a rectangular shape and identical. The panel 250 to be described is also illustrative of the structure of panels 260 and 270. The panel 250 has a pair of elongated parallel sides comprised of the score line 292 and a score line 310 which intersect a pair of parallel sides comprised of the score line 180 and a score line 315.

A sealing tab 280 which is an extension of the sealing tab 225 is affixed to the body panel 270 along a score line 320. The sealing tab 280 has a pair of alongated parallel sides comprised of the score line 320 and an edge 330 which intersect and are perpendicular to the score line 230. The sealing tab 280 also has a fourth edge 335 which intersects the parallel sides 320 and 330, but which is not parallel to the side 230.

A third opening 340 corresponding in shape to the region 298 is located at a convenient location near the bottom of the sealing tab 280 adjacent the score line 20. The opening 340 is positioned in adjacent alignment with the opening 296 when the bird feeder 10 is assembled.

The lower feed dispensing or perch section 40 has a set of four rectangular panels 350, 360, 370 and 380. The panel 350 has a set of two parallel sides comprised of the score line 294 at the base of the body panel 240 and a score line 405 parallel to and spaced from the score line 294. A second pair of sides generally perpendicular to the sides 294 and 405 is comprised of a pair of edges 395, 400 which intersect the score lines 294 and 405.

A tucker panel 410 is foldingly affixed to the panel 350 along the score line 405. The tucker panel 410 is defined by a pair of elongated parallel sides comprising the score line 405 and an edge 415 which intersect a pair of shortened angularly disposed edges 417, 418.

The perch forming panels 360 and 380 are essentially identical and a description of 360 will also describe 380. The panel 360, of a generally rectangular shape, has a pair of parallel sides, the score line 315 and an edge 420 parallel thereto. A second pair of sides is comprised of the die cut edge 400 and a die cut edge 425. The edges 400, 425 are parallel to one another. The edges 400, 425 intersect and are substantially perpendicular to the sides 315 and 420.

A panel 370 also of a generally rectangular shape, but having a slightly larger area than the panels 350, 360 and 380 is located between the panels 360 and 380. The panel 370 has a pair of parallel sides comprised of the edge 425 and an edge 430 which intersect and are substantially perpendicular to the score line 435 and a score line 440.

Foldingly affixed to the panel 370 along the score line 440 is a perch floor 460. The perch floor 460 has a generally rectangular shape with a pair of sides comprised of the score line 440 and a die cut edge 465 which are parallel to each other and which intersect and are perpendicular to a pair of edges 470, 475. The four sides 440, 465, 470 and 475 define the floor of the perch floor 460 when the bird feeder 10 is assembled.

The perch floor 460 is supported by a pair of perch supports 490 and 500. The perch supports 490 and 500 are identical and the following description of the support 490 also applies to the support 500. The support 490 intersects and is affixed to the perch floor 460 along a score line 510. The perch support 490 has a generally triangular shape comprised of the score line 510, an edge 515 and an edge 520. The edge 515 and the edge 520 intersect a circular locking tab 530. The circular locking tab 530 has a semi-circular surface 532 which on one end intersects the edge 520 and on the other end has a locking notch 535 which intersects the edge 515. A fold line 540 extends from the edge 515 to a center portion of the edge 520.

A latch tab 600 is affixed to the panel 460 along the edge 465 by a rectangular region 610. The latch tab 600, being generally of the shape of an arrowhead has a relatively short edge 620 parallel to the edge 465 of the perch floor 460 which intersects, at an acute angle, an edge 630. The edge 620 and the intersecting edge 630 generally bound one-half of the perch retainer tab 600. The other half of the perch retainer tab 600 is bounded by a short edge 640 which is also generally parallel to the edge 465 of the perch floor 460 and which intersects, at an acute angle, a edge 650. The die cut edges 620, 630, 640 and 650 form the arrowhead shape of the perch retainer 600.

As is apparent from FIG. 1, a continuous single line runs across the bottom of each of the panels 240, 250, 260 and 270 with which the score lines 294, 315, 435 are colinear.

FIGS. 2 through 4 illustrate steps in the assembly of the bird feeder 10 of FIG. 1 for use. First of all the onepiece blank is bent back upon itself and the flap 280 has a surface 700 which is secured in firm assembly with the adjoining edges 710 of the panels 50 and 240, thereby forming the article into a sleeve. Such securement can be effected in any convenient manner, for example, with the use of an adhesive or sealant, thereby forming a bonded joint between the adjoining surfaces.

In FIG. 2 the central body section 30 of the sleeve-like article has been folded into an expanded shape so that it bounds a tubular volume having a rectangular cross-section. The first and second elongated rectangular body panels 240 and 260 are oriented parallel to one another and perpendicular to the third and fourth elongated body panels 250 and 270. Thus, the four central body panels 240, 250, 260 and 270 form a rigid four-sided tube with an open top and bottom.

In FIG. 3, the top hanging section 20 with the four top panels 50, 60, 70 and 80 has been folded so as to form a closed top. Folds along the score lines 190, 195 and 215, 220, respectively, form a gusseted roof structure for the feeder on which the front top panel 50 and the rear top panel 60 are in a slant-top angular disposition.

A tab suitable for hanging the assembled bird feeder 10 is formed by locating the tab structure 105 affixed to the front top panel 50 adjacent the tab structure 160 affixed to the back top panel 60 and folding the structure 110 along the score line 120 so that it too is located adjacent the tab structure 160 but on the other side thereof from the tab structure 150. The tab structures 105, 110 and 160 are all sealingly fastened together in firm assembly with one another by means of an adhesive or sealant or by means of a staple or other mechanical fastener. When so folded, the holes 129, 131 and 170 are all in aligned registry and form a single through-opening through which a suspension means S may be connected.

The four lower rectangular panels 350, 360, 370, 380 are oriented in FIG. 3 so that they are essentially parallel with the respective body panels 240, 250, 260, 270.

The bird feeder is filled with a plastic bag filled with wild bird seed. The invention lends itself to a size selection of wide choice. However, a particularly useful size is to place a five (5) pound bag of seed in the tubular enclosure.

The side panels 360 and 380 are then folded over to substantially close the end of the tube and the panel 350 is folded thereover with the tucker flap 410 entering the space adjacent the panel 260 to essentially lock and complete the bottom closure.

The panel 370 is folded over last to underlie the bottom wall of the closure whereupon the panel 460 is bent towards the adjoining front wall or panel 240. The locking tabs 490 and 500 enter the corresponding openings 298 and 340 and the fold or score lines 540 permit the tabs to be folded back upon themselves so that the panel 460 can be folded snugly into a fully closed position in close adjacency with panel 240.

In the fully closed storage position the latch tab 600 enters a detent opening 601 formed by lancing the wall of the panel 240 to provide a displaceable tab 602.

A five pound capacity container somewhat resembles a one-half gallon cardboard milk container. Hence, in the closed position the feeder 10 of the present invention may conveniently be stacked, stored, transported or displayed for sale with great facility. If the prospective user wishes to place the unit in use, the latch tab 600 is pulled out of the detent opening 601 and may be detached from the edge 465, if so desired. The panel 460 is then pulled down so that the gussets formed by the tabs 490 and 500 are extended and so that the latch tabs 530 are engaged against the edges of the respective openings 298 and 340.

In FIG. 4 the perch floor 460 is located at an angle slightly less then 90 degrees, an acute angle, with respect to the front central panel 240 and is held in position by the two perch supports 490 and 500 which have been oriented substantially perpendicular to the perch floor 460.

The plastic bag of bird seed within the enclosure is perforated at the access aperture 305 so that a supply of seed will automatically meter gravitationally through the opening 305 onto the perch floor as shown in FIG. 4.

The paper or chipboard composition of the sheet form material may be weatherproofed if desired as shown in FIG. 5. The sheet member 750 has a top layer 760 and a lower layer 780 of wax disposed on an intermediate layer 770 of paper. The wax layer 760 has a first surface 790 adjacent to the first surface 795 of the sheet material 770 which is of a selected weight and thickness. Similarly, the second wax layer 780 has a first surface 800 adjacent a second surface 805 of the sheet member 770.

The structure of the invention lends itself to attractive enhancement of appearance since the panels form ideal indicia surfaces on which decorative or informative printing may be placed. For example, the window 300 may suggest the window of a building structure and the top section a roof with the tab in simulated brick as for a chimney.

While those skilled in the art may suggest various modifications, alterations or equivalent structures, it should be understood that I wish to embody within the claims of the patent warranted hereon all such modifications, changes or equivalent structures as reasonably come within my contribution to the art.

I claim as my Invention:

1. An expendable bird feeder comprising:
    a cartonized container having a generally rectangular tubular configuration with front, rear and side walls and adapted to enclose a plastic bag of bird seed,
    and a bottom closure for said container including a movable perch flap extendable to form a vertical closure wall adjacent said front wall having locking tabs at the sides thereof receivable in corresponding detent openings at the sides of said front wall,
    said perch flap having a locking tab at its free edge engageable with a detent opening formed in said front wall to lock said perch flap in a closed vertical position,
    a punch-out opening at the bottom of said front wall behind said perch flap and through which bird seed may be metered gravitationally onto the perch surface when said perch flap is moved to said second position,
    whereby said panel flap may be locked in a first storage position adjacent said front wall and may be selectively unlatched and pulled down to a second active position forming a horizontal perch surface extending away from the bottom of the enclosure,
    said container made of wax coated paper stock,
    and a plastic bag of bird seed in said container having a bottom portion opening out of said punch-out opening for selective perforation when ready for use.

2. A bird feeder comprising:
    a single die cut and scored sheet member of selected weight and dimensions having defined thereon,
    a central body section comprising
    a set of four rectangular body panels, each said body panel having two parallel elongated sides intersected by a first and a second parallel end, each said body panel being joined to an adjacent body panel by a score line on said sheet member, said core line defining one of said elongated sides of each said adjacent body panel, a selected one of said elongated sides, of a selected one of said rectangular body panels being a die cut edge;

a top hanging section, comprising four rectangular top panels, each said top panel being joined to an adjacent said first end of a respective said body panel by a score line defined on said sheet member, each said top panel being joined to each adjacent top panel by a score line defined on said sheet member, said top hanging section having affixed thereto at least one hanging tab with a boring therethrough;

a lower feed dispensing section comprising four rectangular feed panels, each said feed panel being joined to an adjacent said second end of a respective said body panel, each said feed panel being separated from each adjacent feed panel by a die cut edge;

a rectangular perch floor and a pair of perch supports foldingly affixed to a pair of parallel edges thereof defined on said sheet member with said perch floor being foldingly affixed to a selected feed panel by a score line perpendicular to said pair of parallel edges;

a sealing tab affixed to said elongated die cut side of said selected body panel;

at least a first and a second rectangularly punched region each selectively located on one of said two elongated sides of said selected body panel and a feed aperature located adjacent said second end of said selected body panel;

whereby said sheet member may be folded along said score lines so that said central body section bounds a volume with a rectangular cross-section with a first and a second of said body panels being parallel to one another and perpendicular to a third and a fourth of said four body panels with said sealing tab being located adjacent and sealingly affixed to a first surface of said selected body panel located adjacent to said body panel to which said locking tab is foldingly affixed, with said four top panels being folded to form a closed top, affixed to said first end of each body panel, with said hanging tab available for use in hanging the assembled bird feeder, with said four feed panels affixed to said second end of each said body panel, being folded to form a closed bottom, and with said perch floor extending outwardly from said selected feed panel, adjacent said second end of said selected body panel and said feed aperture, at a selected acute angle with respect to said selected body panel and with each of said perch supports supportably engaging one of said punched regions on said selected body panel to support said perch floor while a bird sits thereon feeding from said aperture adjacent said perch floor.

3. The bird feeder as defined in claim 2 wherein said sheet member is made of bendable paper stock coated with a layer of wax.

4. The bird feeder according to claim 2, wherein each said perch support comprises at triangularly-shaped panel with a base having a first and a second end corresponding to said score line whereat said perch support is affixed to said perch floor and with a first and a second die cut edge, each intersecting at a first end a different said end of said base, said two edges coming together at a second end to form a locking tab having a circular edge adjacent a locking notch, said circular edge intersecting said second end of said first edge, said notch intersecting said second end of said second edge.

5. The bird feeder according to claim 2, wherein said four top panels of said top section comprise:

a front and a rear rectangular top panel adjacent a front and a rear body panel respectively and a pair of said panels each adjacent said front and rear top panels;

each said side panel having a die-cut edge parallel to said score line between said side panel and said adjacent body panel and in spaced relation thereto;

each said side panel having an isosceles triangle defined thereon with a base corresponding to said score line between said side panel and said adjacent body panel, and with a pair of equal length sides defined by a first and a second score line defined on said side panel;

said first and second score lines each having a first end that intersects a first and a second end, respectively, of said base, said first and second score lines each having a second end, said two second ends intersecting and bisecting said die-cut edge of said panel;

whereby when said bird feeder is assembled, each said isosceles triangle defined on each said side panel may be oriented inwardly, toward said volume enclosed by said body sections, with said front and rear top panels also being folded inwardly at a selected angle and whereby each said equal side of each said isosceles triangle forms the hypotenuse of a right triangle having an elongated side corresponding to said score line between said side panel and said adjacent respective front or rear panel.

6. The bird feeder according to claim 5 wherein said selected angle comprises substantially a forty-five degree angle.

* * * * *